Sept. 8, 1931.  A. W. MEIER  1,822,816
INSERT FOR AUTOMOBILE SPRINGS
Filed July 30, 1930
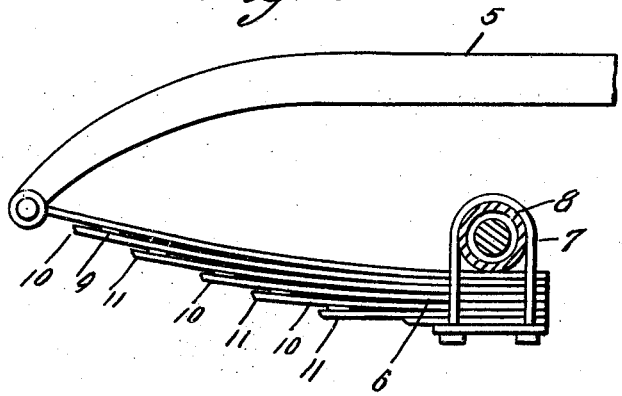
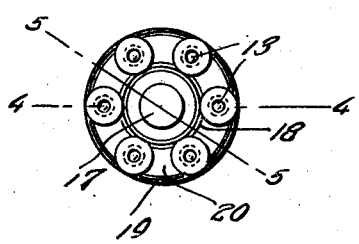
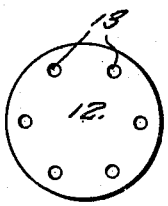
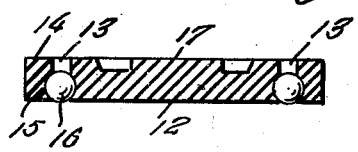
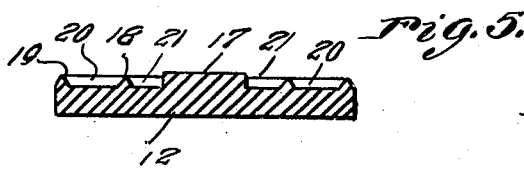
Inventor
*A. W. Meier*
By *Clarence A. O'Brien*
Attorney Patented Sept. 8, 1931

1,822,816

UNITED STATES PATENT OFFICE

AXEL W. MEIER, OF MENASHA, WISCONSIN

INSERT FOR AUTOMOBILE SPRINGS

Application filed July 30, 1930. Serial No. 471,768.

This invention relates to an improved spring insert of resilient ball bearing character for inserting near the end and between the leaves of automobile springs.

It is an object of the invention to provide a resilient ball bearing insert for automobile springs which will eliminate spring squeaks, resulting in easier riding, reduced spring rebound, do away with the necessity of greasing springs and to prevent the ends of the spring leaves from cutting a groove in its next spring leaf.

It is also an object of the invention to provide a device of this character which is inexpensive to manufacture and install, which is highly satisfactory in operation, and otherwise admirably adapted for the purpose for which it is designed.

These and other objects of the invention, its nature and its composition and arrangement and combination of parts will be readily understood by anyone acquainted with the art to which this invention relates, upon reading the following description of the drawings, in which:

Figure 1 is a conventional automobile spring having inserted between the leaves thereof my improved spring insert.

Figure 2 is a top plan view of one modification thereof.

Figure 3 is a bottom view of this modification.

Figure 4 is a cross section on the line 4—4 of Figure 2.

Figure 5 is a cross section of Figure 2 on the line 5—5.

It is to be understood that I do not desire to limit the application of this invention to the particular modification set forth herein, but any change or changes may be made in material or structure consistent with the spirit and scope of the invention.

Referring in detail to the drawings, the numeral 5 represents a conventional spring horn carrying a conventional spring 6 having conventional spring saddles 7 mounted over rear axle housings 8, and in Figure 1, the disposition of the spring insert 9 near the ends of the spring leaves and between adjacent leaves 10 and 11.

The inserts consist of a circular flat plate 12 vertically bored with a plurality of holes 13 which are centered through circular projections 14 arranged within the circumference of the plates 12. Formed in the lower end of said bores 13 is an enlargement 15 to accommodate a ball 16 which may be of steel. In the center of the disc or plate 12 is another circular projection 17 for preventing sidewise displacement when disposed between the leaves of the spring.

A ring 18 and a ring 19 are arranged concentrically upon the upper surface of the plate 12, the ring 19 being disposed at the circumference of the plate 12 and the ring 18 concentrically spaced within said ring 19. The rings 19 and 18 are formed wedge-shaped and the space 20 therebetween forms a vacuum cup for maintaining adhesion when placed in position between adjacent leaves of the spring.

The bores 13 likewise form vacuum cups. The space designated by the numeral 21 also acts as a vacuum cup. The plate and its projections, are preferably formed of resilient pliable material such as rubber. The projection 14 about the bores 13 are provided to furnish an additional amount of material about the ball 16.

The device produces an additional amount of friction at the tips of the spring leaves because the leaves are constantly pressed against both sides of the insert. The spring pressure does not ordinarily bring the balls into play, but they do come into play when driving over rough roads, at high speeds, when the resiliency of the inserts causes them to flatten out and expose the said balls, which then carry the weight or pressure between the spring leaves.

It is obvious that I have provided a device of the character described, which is simple and easy to install, highly satisfactory in operation, and which are cheap to manufacture, and otherwise admirably adapted for the purposes for which it is designed.

I claim:

1. An automobile spring insert comprising a laminated spring of conventional type, a resilient body placed between adjacent leaves of said spring and near the end of the lower of said leaves, said insert comprising a flat circular plate, projections in the form of concentrically spaced rings on one side of said plate, a plurality of cylindrical projections placed within the spaces between said rings, said cylindrical projections and the plate having vertical bores therethrough, and ball bearings in the lower part of said bores, and a projecting friction disk formed centrally of said concentric rings, said bores and the spaces between said rings and between said rings and said projections adapted to act as suction cups to maintain the insert in position between said adjacent leaves of the spring.

2. An insert for placement between the adjacent leaves of an automobile spring comprising a resilient body, a series of closed walls rising from said body, and a series of cylindrical projections arranged between said walls and provided with vertical bores therethrough and through the body, ball bearings in the lower ends of the bores, and a centralized friction disk mounted centrally on said body within said projection and said walls.

In testimony wnereof I affix my signature.

AXEL W. MEIER.